United States Patent
Seki

(10) Patent No.: US 10,632,636 B2
(45) Date of Patent: Apr. 28, 2020

(54) METHOD FOR SPLITTING END PART OF METAL PLATE OR METAL ROD

(71) Applicant: SEKI PRESS CO. LTD., Ibaraki (JP)

(72) Inventor: Masakatsu Seki, Ibaraki (JP)

(73) Assignee: SEKI PRESS CO. LTD, Ibaraki (JP)

( * ) Notice: Subject to any disclaimer, the term of this patent is extended or adjusted under 35 U.S.C. 154(b) by 315 days.

(21) Appl. No.: 15/824,224

(22) Filed: Nov. 28, 2017

(65) Prior Publication Data

US 2018/0079098 A1    Mar. 22, 2018

Related U.S. Application Data

(62) Division of application No. 14/375,948, filed as application No. PCT/JP2012/080802 on Nov. 21, 2012, now Pat. No. 9,855,667.

(30) Foreign Application Priority Data

Jun. 29, 2012   (JP) ................................. 2012-146254

(51) Int. Cl.
  *B21J 5/12*       (2006.01)
  *B26D 3/28*      (2006.01)
  (Continued)

(52) U.S. Cl.
  CPC .............. *B26D 3/28* (2013.01); *B21D 39/00* (2013.01); *B21F 13/00* (2013.01); *B21J 5/12* (2013.01);
  (Continued)

(58) Field of Classification Search
  CPC ...... B21J 5/06; B21J 5/12; B26D 3/28; B26D 3/281; B23D 23/02; B23D 31/02; B21F 13/00; Y10T 83/0267
  See application file for complete search history.

(56) References Cited

U.S. PATENT DOCUMENTS

| 215,539 A | 5/1879 | Peters |
| 376,914 A | 1/1888 | Russell |

(Continued)

FOREIGN PATENT DOCUMENTS

| DE | 69708844 T2 | 6/2002 |
| GB | 297217 A | 9/1928 |

(Continued)

OTHER PUBLICATIONS

Office Action for Japanese Patent Application No. 2012-146254, dated Oct. 11, 2012.

(Continued)

*Primary Examiner* — Edward T Tolan

(57) ABSTRACT

Provided are a method for splitting longitudinally an end part of a metal plate or a metal rod having a rectangular, polygonal, or elliptical shape, in which the length of incision in the split portion can be freely adjusted and smooth split face can be formed; a metal part manufactured by such method; and a method for bonding such metal part. The present invention is characterized by the process comprising the steps of securing a metal plate by pinching both sides thereof with a clamping device, or securing a metal rod by pinching at least two opposite-facing portions on the periphery thereof with a clamping device; splitting longitudinally by slitting or cleaving the metal plate, or the metal rod, by pressing a slitting punch or a cleaving punch against the face of one end of the metal plate, or the metal rod; and advancing the splitting further by repeating the same operation of pressing the same punch stated above against the cleft of the splitting; and is characterized further in that, in each time of the press-splitting operation, the position of the clamping device on at least one side is moved in advance of the next pressing by a stroke corresponding to the distance (Continued)

from one end of the metal plate, or the metal rod, to the distal end of a split-desired portion.

4 Claims, 11 Drawing Sheets

(51) Int. Cl.
| | | |
|---|---|---|
| *B21F 13/00* | (2006.01) | |
| *B23D 23/02* | (2006.01) | |
| *F16B 5/00* | (2006.01) | |
| *F16B 17/00* | (2006.01) | |
| *B21D 39/00* | (2006.01) | |
| *B23K 31/02* | (2006.01) | |
| *B32B 38/00* | (2006.01) | |
| *B23D 31/00* | (2006.01) | |
| *B23D 33/08* | (2006.01) | |

(52) U.S. Cl.
CPC .............. *B23D 23/02* (2013.01); *B23K 31/02* (2013.01); *B32B 38/0004* (2013.01); *F16B 5/0096* (2013.01); *F16B 17/004* (2013.01); *B23D 31/00* (2013.01); *B23D 33/08* (2013.01); *Y10T 29/49826* (2015.01); *Y10T 29/49948* (2015.01); *Y10T 29/49956* (2015.01); *Y10T 83/0267* (2015.04); *Y10T 156/1064* (2015.01); *Y10T 428/12229* (2015.01); *Y10T 428/12375* (2015.01); *Y10T 428/12389* (2015.01); *Y10T 428/24612* (2015.01)

(56) References Cited

U.S. PATENT DOCUMENTS

| | | |
|---|---|---|
| 1,281,649 A | 10/1918 | Peterson |
| 1,925,721 A | 9/1933 | Johnston |
| 3,020,636 A | 2/1962 | Ayton et al. |
| 4,040,177 A | 8/1977 | Beeler et al. |
| 4,275,491 A | 6/1981 | Marinucci |
| 4,417,493 A | 11/1983 | Ohuchi et al. |
| 4,433,949 A | 2/1984 | Hallock |
| 4,827,612 A | 5/1989 | Andersen |
| 4,909,763 A | 3/1990 | Andersen |
| 4,970,782 A * | 11/1990 | Andersen ............... H01R 43/16 29/874 |
| 6,523,387 B2 | 2/2003 | Andersen |
| 6,718,812 B1 | 4/2004 | Jaekel |
| 7,182,234 B2 | 2/2007 | Rayssac et al. |
| 8,702,359 B2 | 4/2014 | Miyahara |

FOREIGN PATENT DOCUMENTS

| | | |
|---|---|---|
| GB | 768261 A | 2/1957 |
| JP | S60223621 A | 11/1985 |
| JP | 61129241 A | 6/1986 |
| JP | 6378639 A | 5/1988 |
| JP | 6378639 U | 5/1988 |
| JP | H04013031 | 5/1992 |
| JP | 06210361 A | 8/1994 |
| JP | 8267162 A | 10/1996 |
| JP | 8300082 A | 11/1996 |
| JP | 09225559 | 9/1997 |
| JP | 200245940 | 2/2002 |
| JP | 2003305527 B | 10/2003 |
| JP | 2010052038 A | 3/2010 |
| WO | 9409928 A1 | 5/1994 |
| WO | 0054905 A1 | 9/2000 |

OTHER PUBLICATIONS

Office Action for Japanese Patent Application No. 2012-250910, dated Dec. 18, 2012.

European Supplementary Search Report received for European patent Application No. 12879679.4, dated Feb. 23, 2016.

Office Action received for European Patent Application No. 12879679. 4, dated Dec. 12, 2016, 5 pages.

\* cited by examiner

FIB. 1C

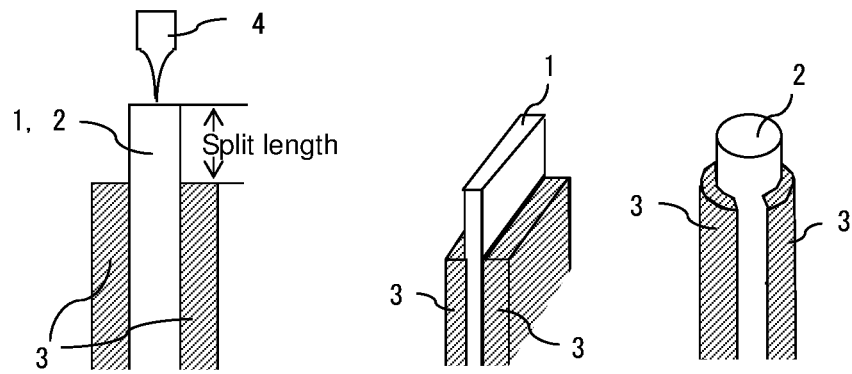
FIG. 2A
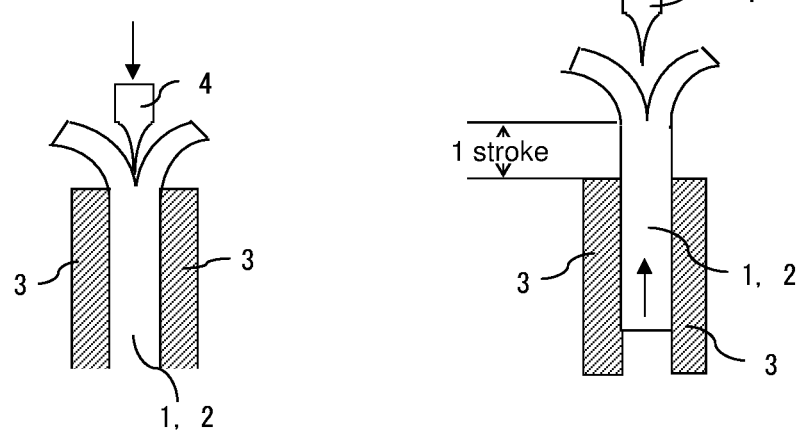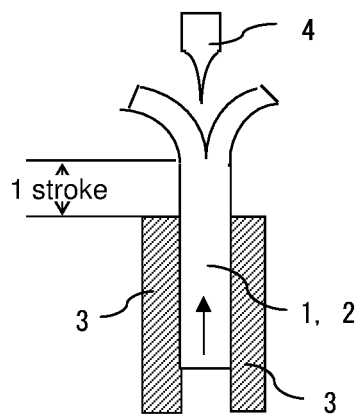
FIG. 2B   FIG. 2C
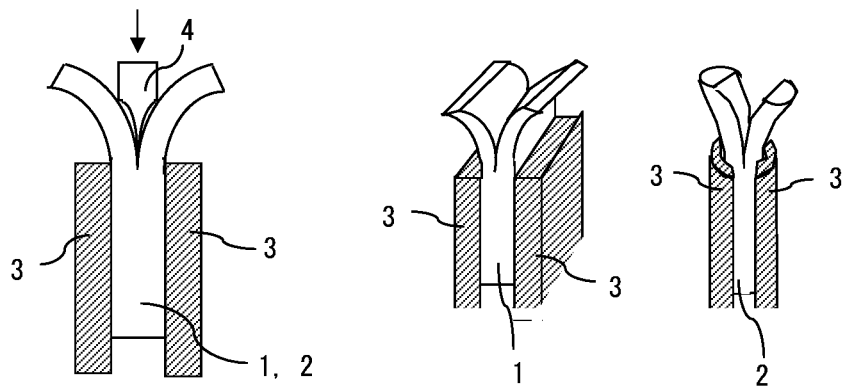
FIG. 2D (c) Clamping device movement

METHOD FOR SPLITTING END PART OF METAL PLATE OR METAL ROD

CROSS-REFERENCE TO RELATED APPLICATIONS

This application is a division of, claims the benefit of and priority to, previously filed U.S. patent application Ser. No. 14/375,948 entitled "METHOD FOR SPLITTING END PART OF METAL PLATE OR METAL ROD, METAL PARTS MANUFACTURED BY SUCH END SPLITTING METHOD, AND METHOD FOR BONDING SUCH METAL PARTS" filed on Jul. 31, 2014, which is a national phase claiming the benefit of, and priority to, International Patent Application No. PCT/JP2012/080802 filed on Nov. 21, 2012, which claims priority to Japanese Patent Application No. 2012-146254 filed on Jun. 29, 2012, the subject matter of which are hereby incorporated by reference in their entireties.

TECHNICAL FIELD

The present invention relates to a method for splitting an end part of a metal plate having any of a rectangular, polygonal, or elliptical shape, or an end part of a metal rod having a cross-section of any of a circular, elliptical, rectangular, or polygonal shape, in the longitudinal direction with respect to the metal plate or the metal rod, wherein the method permits free-adjustment of the length of incision in the split portion and provides smooth and even split faces.

BACKGROUND OF THE INVENTION

Until now in the field of sheet metal V-pulleys and sheet metal brake shoes, a manufacturing method such that a rotating slitting roller or a rotating cleaving roller is pressed against the outer peripheral portion of a circular metal material to split such portion into two parts is known (see Patent literatures 1 to 5). This method has advantages of excellent dimensional accuracy and reliability together with reduced manufacturing cost compared to a conventional method such as welding, press-forming, or casting, because the method can split accurately and easily a blank at a desired position in the thickness direction of the outer periphery thereof.

Further, Patent literatures 6 and 7 have disclosed a forming method in the manufacture of V-pulleys. In the disclosed method, one of two lugs (or formed portions of a guide), which are to be formed on the both sides of outer periphery of a cylindrical body bulging in the axial direction for prevention of V-belt slip-off, is formed by cleaving using a cylindrical-shaped cleaving punch.

Patent literature 8 has proposed a forming method in the manufacture of drum brakes. In the proposed method, the circumferential peripheral portion of a bottomed cylindrical metal body is cut by a cutting die in order to form a dust cover portion integrally with a flange portion and then the cut portion is drawn by a press die to form a cylindrical portion that works as the integrated dust cover.

Further, a method of end splitting for a workpiece of relatively soft material, different from a metal plate or a metal rod, has been disclosed in Patent literature 9. This method is to cut a divider strip of soft synthetic resin into longitudinal halves by pulling the divider strip with a cutter blade applied on the cross-section of the end thereof.

{Patent Literature 1}
 Japanese patent application laid-open No. 1986-129241

{Patent literature 2}
 Japanese patent No. 3686903
{Patent literature 3}
 Japanese patent application laid-open No. 1994-210361
{Patent literature 4}
 Japanese patent No. 2520095
{Patent literature 5}
 Japanese patent application laid-open No. 1996-267162
{Patent literature 6}
 International publication No. WO 00/54905
{Patent literature 7}
 Japanese patent application laid-open No. 1996-300082
{Patent literature 8}
 Japanese patent application laid-open No. 2002-45940
{Patent literature 9}
 Japanese utility model application laid-open No. 1988-78639

SUMMARY OF THE INVENTION

In contrast, if there is a method that is applicable to the longitudinal splitting of the end part of a metal plate having any of a rectangular, polygonal, or elliptical shape, or a metal rod having a cross-section of any of a circular, elliptical, rectangular, or polygonal shape, i.e., not a circular metal material like a V-pulley or a brake shoe mentioned above, various applications of such method will be promising. For example, if a metal plate or a metal rod having a style of Figure-Y shape, Figure-T shape, or Figure-L shape can be manufactured simply by splitting-forming and mold-press forming without undergoing a process of welding, fusing, or gluing, a large cost-cut in manufacturing will be achieved through reduction in use quantity of material and manufacturing man-hours. Further, an effect of significant improvement in the reliability of the bonding or joining, which has been a problem in the conventional methods such as welding, fusing, or gluing, becomes achievable.

In addition, when welding or fusing method is used in the bonding between plates of dissimilar metals, it is hard to obtain a bonding with adequate quality due to difference in physical properties of both metals such as electrical conductivity, thermal conductivity, or melting point. Therefore, even though adequate bonding quality be obtained, the stability thereof is not assured because such methods create very brittle intermetallic compounds at the bonding interface. In the case that the bonding between two dissimilar metal plates is made by gluing, a low bonding strength is unavoidable due to difference in linear expansion coefficient between the two; thus, ensuring reliable bonding has been a major issue. In contrast to this, the strength and reliability of bonding or joining will be largely improved when performed in a manner: splitting the end part of a first metal plate, or a first metal rod, sandwiching a second metal plate of dissimilar material between the end split portions of the first metal plate, or the first metal rod, to form a three-layer build-up, and then perform bonding or joining with a conventional method.

Further, if free-adjustment of the split length (or depth) at the split portion on the end of a metal plate or a metal rod becomes practicable, flexibility in the shaping process will increase. Consequently, the applicability of the invented method to the fields of precision parts, hard-to-process parts, and parts that require high reliability and durability will significantly expand.

However, the splitting methods described in Patent literatures 1 to 5 listed above are to be applied to metallic workpieces of circular or disk-like metal plates. In those methods, a splitting roller or a cleaving roller is pressed against the peripheral portion of the metal plate to split the portion with the roller rotated in synchronization with the rotation of the circular or disk-like metal plates. Therefore, the methods are not applicable to metal plates having any of a rectangular, polygonal, or elliptical shape, or to a metal rod having a cross-section of any of a circular, elliptical, rectangular, or polygonal shape. The rotating of the metallic workpiece and the roller produces uniform splitting to a specified length (or depth) only when applied to a metallic workpiece that is a metal plate having a circular or a disk-like shape. In the case of a metal plate or a metal rod having a style other than circular or disk-like shape however, it is not possible to obtain such an effect because a uniform rotation of the working face is impossible to attain.

In addition, Patent literatures 6 and 7 listed above describe a cleaving machining using a cylindrical-shaped cleaving punch but that cleaving machining intends to form a small lug (or the formed portion of a guide) for prevention of V-belt slip-off. Thus, the literatures do not describe nor suggest a method for splitting further the lug (or the formed portion of a guide) to a freely-determined length of incision. This means that the art described in the literatures has not recognized an active use of the split metal portion as a constituent of a metallic part.

The method described in Patent literature 8 listed above cuts the circumferential peripheral portion of a bottomed cylindrical metal body using a cup die. In this processing, the bottomed cylindrical body should be rotated so as to obtain an even split face. Therefore, this method is not applicable to metal plates or metal rods having any of a rectangular, polygonal, or elliptical shape, similarly in the above-stated case.

The invention described in Patent literature 9 listed above is a method for cutting the cross-section of a divider strip of relatively soft synthetic resin to split the divider strip; the defined art is different one from forming by the splitting, slitting, or cleaving of a metal rod. This means that that invention has not recognized any technical matter that could arise as a problem in splitting a cross-sectional end of a metallic material. Thus, that art cannot be applicable to the end splitting of a metal plate or metal rod, as the art is.

As stated above, there has been strong desire for a method for splitting, similarly in the circular or disk-like shaped metal plate, an end part of a metal plate having any of a rectangular, polygonal, or elliptical shape, or an end part of a metal rod having any of a cross-section of a circular, elliptical, rectangular, or polygonal shape, in the longitudinal direction with respect to the metal plate or the metal rod. In spite of such desire, few ideas have been proposed until now that permits free-adjustment of the length of incision in the split portion and providing a smooth split faces.

The present invention is made to solve such problems and an object of the invention is to provide a method for splitting an end part of a metal plate having any of a rectangular, polygonal, or elliptical shape, or an end part of a metal rod having a cross-section of any of a circular, elliptical, rectangular, or polygonal shape, in the longitudinal direction with respect to the metal plate or the metal rod, wherein the method permits free-adjustment of the length of incision in the split portion and provides a smooth split surfaces.

Further, the present invention aims to provide a metal parts having a high-function and a high-value added feature manufactured by the method for splitting an end part of metal plate or metal rod stated above, and to provide a high strength and reliability bonding method of metal parts.

The inventor of the present invention has reached this invention based on a finding that the above-stated problems can be solved by repeating press-splitting using a slitting punch or a cleaving punch consecutively many times, not only one time, in splitting an end part of a metal plate having any of a rectangular, polygonal, or elliptical shape, or an end part of a metal rod having any of a cross-section of a circular, elliptical, rectangular, or polygonal shape, and by moving the position of a clamping device for pinching the metal plate or the metal rod in each time of the press-splitting operation so that the length of the incision in the splitting can be freely adjusted to the optimized condition.

That is, the configuration of the present invention is as follows.

(1) The present invention is to provide a method for splitting an end part of a metal plate having any of a rectangular, polygonal, or elliptical shape, or an end part of metal rod having a cross-section of any of a circular, elliptical, rectangular, or polygonal shape, in the longitudinal direction with respect to the metal plate, or the metal rod, wherein the method comprises; securing the metal plate by pinching both sides thereof with a clamping device, or securing the metal rod by pinching at least two opposite-facing portions on the periphery thereof with a clamping device; and advancing the splitting by pressing the slitting punch or the cleaving punch against a cleft of the split for repeatedly two or more times until a split length reaches a specified extent, wherein, in advance of each time of each subsequent splitting operation of the two or more times, a position of at least one side of the clamping device that pinches both sides of the metal plate in securing or that pinches at least two opposite-facing portions on the periphery of the metal rod in securing, is moved along the metal plate or the metal rod in advance by a stroke corresponding to a distance from a position of the cleft of the split toward to the distal end of a split-desired portion, followed by securing of the metal plate by pinching both sides thereof with the clamping device, or by securing of the metal rod by pinching at least two opposite-facing portions on the periphery with the clamping device, wherein, in each interval between splitting operations of the two or more times, pressing of the splitting punch or the cleaving punch is suspended and the splitting punch or the cleaving punch is moved back to a relatively opposite direction from a split-desired direction, wherein, on both sides in the case of the splitting punch or on one side in the case of the cleaving punch, a cutting edge is given a tapering shape having at least two taper portions of different angles or curvatures so that the taper portion of the side close to the tip end of the cutting edge has a smaller inclination angle from a horizontal line based on the definition that the inclination of the horizontal line is zero, or a smaller curvature than that of the taper on the side apart from the tip end of the cutting edge.

(2) The present invention is to provide a method for splitting a portion of end part of a metal plate having any of a rectangular, polygonal, or elliptical shape, or a portion of end part of metal rod having a cross-section of any of a circular, elliptical, rectangular, or polygonal shape, partially in the longitudinal direction with respect to the metal plate, or the metal rod, wherein the method comprises; determining a desired length of cutting plane in a thickness direction of the metal plate, or in a diameter direction of the metal rod; applying a slitting punch or a cleaving punch on a split-desired end of the metal plate, or the metal rod, on a boundary created by the cutting plane; securing the metal plate by pinching both sides of a split-desired portion thereof with a clamping device, or securing the metal rod by pinching at least two opposite-facing portions on the periphery of a split-desired portion thereof with a clamping device; and advancing the splitting by pressing the slitting punch or the cleaving punch against the cleft of a partial-split for repeatedly two or more times until a split length reaches a specified extent, wherein, in advance of each time of each subsequent splitting operation of the two or more times, a position of at least one side of the clamping device that pinches both sides of the split-desired portion of the metal plate in securing or that pinches at least two opposite-facing portions on the periphery of the split-desired portion of the metal rod in securing, is moved along the metal plate or the metal rod in advance by a stroke corresponding to a distance from a position of the cleft of the split toward to the distal end of a split-desired portion, followed by securing of the metal plate by pinching both sides thereof with the clamping device, or by securing of the metal rod by pinching at least two opposite-facing portions on the periphery with the clamping device; and thereby the metal plate, or the metal rod, is partially split in the longitudinal direction along the cutting plane, wherein, in each interval between splitting operations of the two or more times, pressing of the splitting punch or the cleaving punch is suspended and the splitting punch or the cleaving punch is moved back to the relatively opposite direction from a split-desired direction, wherein, on both sides in the case of the splitting punch or on one side in the case of the cleaving punch, a cutting edge is given a tapering shape having at least two taper portions of different angles or curvatures so that the taper portion of the side close to the tip end of the cutting edge has a smaller inclination angle from a horizontal line based on the definition that the inclination of the horizontal line is zero, or a smaller curvature than that of the taper on the side apart from the tip end of the cutting edge.

(3) The present invention is to provide a method for splitting an end part of the metal plate, or a metal rod, according to the method defined in the method (1) stated above, wherein movement of the position is performed by moving either the at least one side of the clamping devices or the metal plate, or the metal rod, so that one end of the clamping devices or the metal plate, or the metal rod, will come to almost the same position of the distal end of the split-desired portion from one end of the metal plate, or the metal rod.

(4) The present invention is to provide a method for splitting an end part of the metal plate, or a metal rod, according to the method defined in the method (1) stated above, wherein the press-splitting is performed by pressing the slitting punch or the cleaving punch by a specified stroke in one direction.

(5) The present invention is to provide a method for splitting an end part of the metal plate, or a metal rod, according to the method defined in the method (1) stated above, wherein, in the process of splitting the metal plate, or the metal rod, longitudinally with respect to the metal plate, or the metal rod, by slitting or cleaving and in the process of advancing the splitting by the slitting or cleaving further, the press-splitting by the slitting punch or the cleaving punch is performed with a progressive transfer method comprised of separate processing stages, wherein, in advance of each time of each subsequent splitting operation of the tow or more times, a position of at least one side of the clamping device that pinches both sides of the split-desired portion of the metal plate in securing or that pinches at least two opposite-facing portions on the periphery of the split-desired portion of the metal rod in securing, is moved along the metal plate or the metal rod in advance by a stroke corresponding to a distance from a position of the cleft of the split toward to the distal end of a split-desired portion, followed by securing of the metal plate by pinching both sides thereof with the clamping device, or by securing of the metal rod by pinching at least two opposite-facing portions on the periphery with the clamping device.

(6) The present invention is to provide a method for splitting an end part of the metal plate, or a metal rod, according to the method defined in the method (1) stated above, wherein a groove cut or a nick line is made in advance on at least one place in the peripheral portion of the end part of the metal plate, or the metal rod, wherein the at least one indicates place where the slitting punch or the cleaving punch is applied to and a place periphery of the metal plate that corresponds to the split-desired portion of the metal plate, or the metal rod.

(12) The present invention is to provide a method for splitting an end part of the metal plate, or a metal rod, according to the method defined in the method (2) stated above, wherein movement of the position is performed by moving either the at least one side of the clamping devices or the metal plate, or the metal rod, so that one end of the clamping devices or the metal plate, or the metal rod, will come to almost the same position of the distal end of the split-desired portion from one end of the metal plate, or the metal rod.

(13) The present invention is to provide a method for splitting an end part of the metal plate, or a metal rod, according to the method defined in the method (2) stated above, wherein the press-splitting is performed by pressing the slitting punch or the cleaving punch by a specified stroke in one direction.

(14) The present invention is to provide a method for splitting an end part of the metal plate, or a metal rod, according to the method defined in the method (2) stated above, wherein, in the process of splitting the metal plate, or the metal rod, longitudinally with respect to the metal plate, or the metal rod, by slitting or cleaving and in the process of advancing the splitting by the slitting or cleaving further, the press-splitting by the slitting punch or the cleaving punch is performed with a progressive transfer method comprised of separate processing stages, wherein, in advance of each time of each subsequent splitting operation of the tow or more times, a position of at least one side of the clamping device that pinches both sides of the split-desired portion of the metal plate in securing or that pinches at least two opposite-facing portions on the periphery of the split-desired portion of the metal rod in securing, is moved along the metal plate or the metal rod in advance by a stroke corresponding to a distance from a position of the cleft of the split toward to the distal end of a split-desired portion, followed by securing of the metal plate by pinching both sides thereof with the clamping device, or by securing of the metal rod by pinching at least two opposite-facing portions on the periphery with the clamping device.

(15) The present invention is to provide a method for splitting an end part of the metal plate, or a metal rod, according to the method defined in the method (2) stated above, wherein a groove cut or a nick line is made in advance on at least one et place in the peripheral portion of the end part of the metal plate, or the metal rod, wherein the at least one place indicates where the slitting punch or the cleaving punch is applied to and a place periphery of the metal plate that corresponds to the split-desired portion of the metal plate, or the metal rod.

Applying the present invention makes it practicable to split an end part of a metal plate having shapes other than circular or disk-like shape, for example, any of a rectangular, polygonal, or elliptical shape, or an end part of a metal rod having a cross-section of any of a circular, elliptical, rectangular, or polygonal shape, by performing the press-splitting of the end part of a metallic material a number of times continuously using a slitting punch or a cleaving punch. In addition, in the multiple press-splitting described above, it becomes practicable to adjust the length of the incision in the splitting freely within the desired range by adjusting the position of the clamping device for pinching a metal plate, or a metal rod, in each time of the press-splitting operation. Further, an end splitting method, which has an excellent productivity with lowered manufacturing cost, can be built by performing the press-splitting continuously with one direction feed at a specified stroke or with a progressive transfer method. Furthermore, applying the slitting punch or the cleaving punch on the splitting position becomes easy by making in advance a groove cut or a nick line on at least any one of the metal plate or a periphery of the metal plate that corresponds to the split-desired portion of the metal rod, permitting a highly accurate end splitting with a simple manner. Moreover, the splitting by the press-splitting develops along the groove cut or the nick line making the end splitting easy.

The metal parts manufacture by the end splitting method of the present invention is compatible with not only changing freely the length of split portion but also adjustment of split thickness freely to a desired thickness by changing the thickness ratio in the split plane or by machining for folding the split portion. Thereby, it becomes possible to manufacture high-value added metal parts that were hard to manufacture by the conventional method. In addition to the above, the metal parts manufactured by the end splitting method of the present invention is feasible for employing a new bonding method that was unprecedented. For example, when bonding a metal part by the present invention with the other metal parts, bonding them in a condition of three-layer build-up, wherein the other metal part is sandwiched, will largely increase the bonding strength and joining reliability. Therefore, the applicability of the bonding method for metal parts by the present invention to the fields that require more increased thermal resistivity and more enhanced environment resistance can significantly expand.

BRIEF DESCRIPTION OF THE DRAWINGS

FIGS. 1A to 1D are an explanatory illustration of steps of the press-splitting in the first embodiment of the method for splitting the end part of a metal plate, or a metal rod, according to the present invention, wherein the slitting punch is used while moving the clamping device.

FIGS. 2A to 2D are an explanatory illustration of steps of the press-splitting in the second embodiment of the method for splitting the end part of a metal plate, or a metal rod, according to the present invention, wherein the slitting punch is used while moving the metal plate, or the metal rod.

DETAILED DESCRIPTION OF THE PREFERRED EMBODIMENTS

Figure 1A:
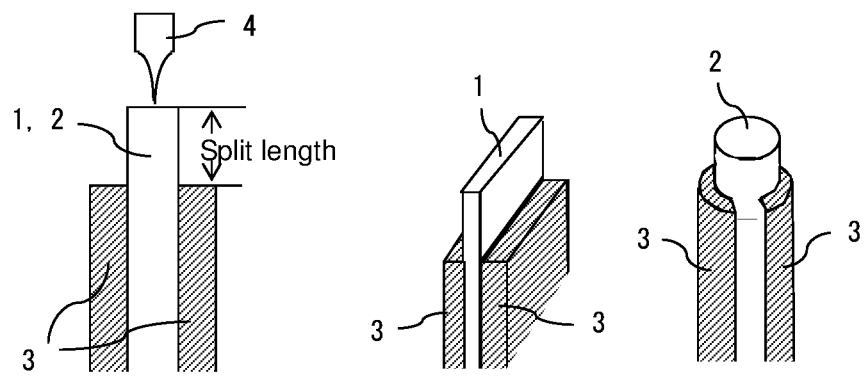

To split an end part of a metal plate having shapes other than circular or disk-like shape, i.e., any of a rectangular, polygonal, or elliptical shape, or an end part of a metal rod having a cross-section of any of a circular, elliptical, rectangular, or polygonal shape, the end splitting method by the present invention applies a press-splitting on the end part of such metallic material a number of times continuously using a slitting punch or a cleaving punch; this is the first feature. Further, the position of a clamping device for pinching the metal plate, or the metal rod, is adjusted in each time of such multiple operation of the press-splitting in order not only to form an even split face but also to adjust freely the length of incision in the split portion; this is the second feature.

Unlike splitting metallic materials having a circular or a cylindrical shape such as a conventional style of V-pulley or break shoe, splitting an end part of a metal plate having any of a rectangular, polygonal, or elliptical shape, or an end part of a metal rod having a cross-section of any of a circular, elliptical, rectangular, or polygonal shape, as are in the present invention, is not compatible with a method that applies a slitting punch or a cleaving punch for creating split plane in a rotating manner, or with a method that processes a metallic workpiece such as metal plate, or a metal rod, giving rotation to the workpiece. Further, what applying the press-splitting process using the slitting pinch or the cleaving punch to the end part of the metal plate, or the metal rod, simply one time can form is a protrusion about a lug level; it is therefore hard to form a split of enough length (or depth). To make the split longer, use of a cutter instead of the slitting punch or the cleaving punch could be an alternative method. However, cutting the end part longitudinally with a cutter cannot avoid thickness reduction in the metal plate, or the metal rod, due to the thickness of the cutter used, which makes it hard to apply the cutter-cutting to a thin metal plate or a small-diameter metal rod. In addition, cutting with a cutter not only invites roughening the split face attributable to cutting debris or lowering in the work efficiency due to generation of frictional heat but also makes the processing complicated because such cutting requires cleaning of the split faces after cutting. Thus, the present invention applies the press-splitting to the end part of the metal plate, or the metal rod, using a slitting punch or a cleaving punch consecutively repeating many times to lengthen (or deepen) the split portion. The method for splitting an end part by the present invention comprises mainly two processing stages described below.

The first processing stage comprises the steps of: securing a metal plate by pinching both sides thereof with a clamping device or securing a metal rod by pinching at least two opposite-facing portions on the periphery thereof with a clamping device; applying a slitting punch or a cleaving punch against the cross-sectional face of one end of the metal plate, or the metal rod, to be split; and splitting the metal plate, or the metal rod, longitudinally by slitting or cleaving with a press-splitting. The second processing stage comprises the step of advancing the splitting by giving again the press-splitting with the slitting punch or the cleaving punch at the cleft of the split created in the first processing stage, wherein this press-splitting operation is performed one time or repeated two or more times until the split length (or depth) reaches the specified range. In the first and second processing stages, the position of at least one side of the clamping device that pinches both sides of the metal plate or that pinches at least two opposite-facing portions on the periphery of the metal rod is, in each time of the press-splitting operation, moved in advance by a stroke corresponding to the distance from one end of the metal plate, or the metal rod, to the distal end of a split-desired portion. In this movement, it is preferable to adjust the position of the clamping device that pinches the metal plate, or the metal rod, by moving either the clamping device on at least one side of the clamping devices or the metal plate, or the metal rod, so that one end of the clamping device on at least one side of the clamping devices will come to almost the same position of the distal end of the split-desired portion from one end of the metal plate or the metal rod. Thereby, the split length at the end part of the metal plate, or the metal rod, can be adjusted within the specified range.

In the present invention, the rectangular shape means a shape of a square or a cuboid and the polygonal shape means shapes of polygons having five or more sides or triangle except for the tetragon but including those variant having irregular shapes; however, those polygons having shapes close to circles, particularly those having more sides than 12-side, are excluded. A metal plate of an elliptical shape means a plate having a long side A and a short side B in a ratio (A/B) of 1.2 or more. As the metal rod that the present invention relates, a rod having a circular or an elliptical cross-section is mainly used; however, a rod having a rectangular or a polygonal cross-section may be used as a metallic workpiece as well.

The end splitting method of the present invention is a method for splitting longitudinally with respect to the metal plate, or the metal rod, having above-stated shape. In the invention, the term "splitting longitudinally" means, in the case of the metal plate, that the splitting develops in the width-wise direction or in the depth-wise direction, wherein the workpiece is split so that the split plane will spread within the thickness of the metal plate. In the case of the metal rod, that term means that the cross-section of the metal rod is split in the lengthwise of the rod. Further, the end splitting method of the present invention can split the cross-section of the metal plate, or the metal rod, not only into equal sections but also into a desired section-ratio depending on the shape or function that the forming-completed workpiece may require. In addition, not only splitting into two sections, the cross-section of the metal plate, or the metal rod, may be split also into three or more sections. In such event, lengths (or depths) of splits can be equal or different each other.

The present invention does not have any particular limitation to material nature of the metal plate, or the metal rod, to which the invented end splitting method apply. However, copper, aluminum, stainless steel, brass, and iron are suitable material, because they have a wide range of applicability, a great market-needs as a high value-added metal product, and capability of responding to a demand on lowering manufacturing cost.

The following explains embodiments of the end splitting method by the present invention.

First Embodiment

Figure 1B:
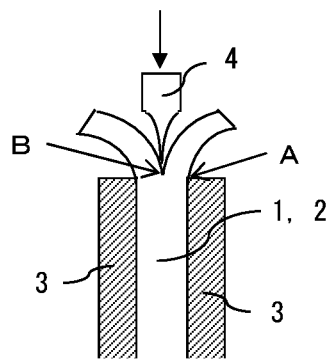
Figure 1D:
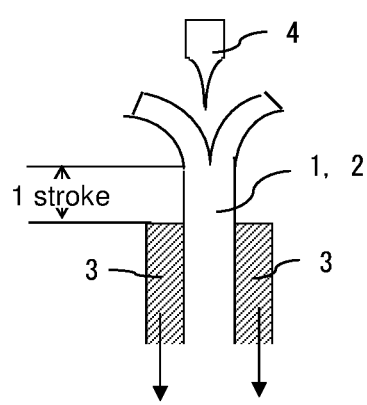
Figure 1D:
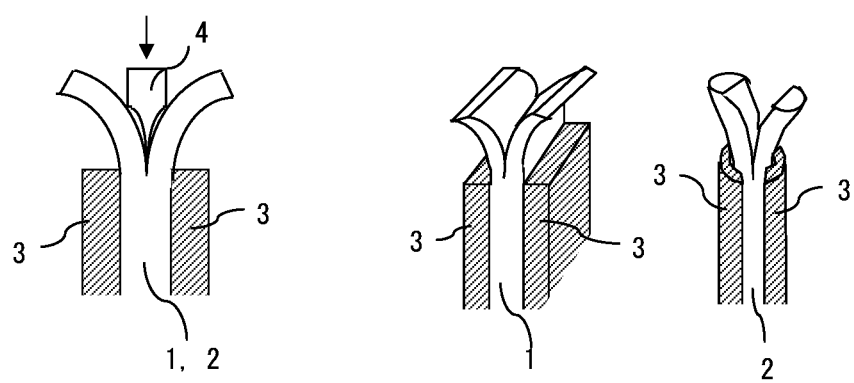

FIGS. 1A to 1D are an explanatory illustration of steps of the press-splitting in the first embodiment of the method for splitting the end part of a metal plate 1, or a metal rod 2, according to the present invention, wherein a slitting punch 4 is used while moving a clamping device 3. As FIGS. 1A to 1D illustrate, the end splitting method in this embodiment comprises the steps of: securing the metal plate 1 or, the metal rod 2, by pinching with the clamping device 3 (FIG. 1A); performing press-splitting applying the slitting punch 4 on the face of one end of the metal plate 1, or the metal rod 2 (FIG. 1B); moving the clamping device 3 to the split-desired position and securing again the metal plate 1, or the metal rod 2, by pinching with the clamping device 3 to secure (FIG. 1C); and applying the slitting punch 4 on the cleft of the split portion to advance splitting by the press-splitting (FIG. 1D). The steps illustrated in FIGS. 1C and 1D are repeated until the split length (or depth) reaches the specified extent. Finally, the metal plate 1, or the metal rod 2, is formed into a shape having a split plane as illustrated in a perspective view in FIG. 1D. After that, the end-split metal plate, or metal rod, undergoes press-forming, crimping or press-squeezing to be formed into a metal product having a shape of, for example, Figure-T, Figure-L, or Figure-Y.

In the step illustrated in FIG. 1A, the metal plate 1 is secured by clamping device 3 with both sides pinched and the metal rod 2 is secured by clamping device 3 with at least two opposite-facing portions on the periphery thereof pinched. Pinching at least two opposite-facing portions on the periphery of the metal rod 2 makes securing the metal rod 2 tight. In addition, such a clamping device that holds entire circumference of the metal rod 2 may be usable as a method for securing the metal rod 2.

In the step illustrated in FIG. 1B, the end splitting of the metal plate 1, or the metal rod 2, using the slitting punch 4 is performed to the position almost the same as the position of one end of the clamping device 3 that pinches the metal plate 1, or the metal rod 2. In the portion pinched with the clamping device 3, breakage or cleaving of the tissue of the metallic workpiece is suppressed due to compressive stress generated by the pinching force caused by the clamping device 3, which prevents occurrence of splitting during the press-splitting by the slitting punch 4. Therefore, adjusting the working position of the clamping device can control freely the length of splitting. That "the position of one end of the clamping device 3 that pinches the metal plate 1, or the metal rod 2, is almost the same as the position of the distal end of the split-desired portion" means a place where one end of the clamping device 3 sits is within the range of −3 mm to +1 mm, more preferably −1 mm to +0.5 mm, from the distal end of the split-desired portion. In this, the place −3 mm means a position where the end A of the clamping device 3 indicated in FIG. 1B sits at a point 3 mm apart downward from the distal end B of the split-desired portion. In contrast, the place+1 mm means a position where the end A sits at a point 1 mm apart upward from the distal end B; this means that the length of the development of splitting within the portion pinched with the clamping device is 1 mm inward from the position of the end A at a maximum. Thus, the clamping device 3 moreover has a function to terminate the development of the splitting.

In general, when the pressure in the press-splitting by the slitting punch 4 is high or the applying speed of the press-splitting is high, positional deviation of the distal end of the end-splitting portion from one end of the clamping device 3 tends to become large. Such state is not desirable, because the state invites not only difficulty in the adjustment of the splitting length (or depth) on the end of split portion but also deformation of the metal plate 1, or the metal rod 2, and easiness of occurrence of minute cracks at the distal end of the split. Further, if the split-forming pressure is too low or the split-forming speed is too low, the splitting is not fully achieved and results in a large positional deviation from one end of the clamping device 3. In addition to the above in such event, a problem arises in that the work efficiency in the splitting will become low. Therefore, the present invention requires the optimizing of the pressure and speed of the split-forming in performing the press-splitting so that the positional deviation of the distal end of the end split portion from one end of the clamping device 3 will be minimized. This means that the bringing of the position of one end of the clamping device 3 for pinching the metal plate 1, or the metal rod 2, to almost the same position as the distal end of the split-desired portion will be followed, as a result, by a setting that the conditions for the press-splitting by the end splitting method of the present invention is optimized. In this embodiment, the press-splitting is performed under the conditions that the pressing load and the press-loading speed are in the range of 1 to 10 tons and 1 to 50 mm/s respectively. In addition, in view of the balance between performance and cost of a press apparatus, it is preferable that the press load and the press-loading speed should be in the range of 2 to 5 tons and 2 to 10 mm/s respectively.

In the step illustrated in FIG. 1C, the clamping device 3 moves to the split-desired position with the metal plate 1, or the metal rod 2, clamped. In this embodiment, both sides of the clamping device 3 that pinches both sides of the metal plate 1, or that pinches at least two opposite-facing portions on the periphery of the metal rod 2, are moved usually simultaneously. The moving distance may be the same as, or different from, the one in the step illustrated in FIG. 1A. In this operation, changing the conditions of the pressing load and the press-loading speed in the press-splitting with the slitting punch 4 is not always necessary because such conditions have an allowance to some extent. However, if a change in the moving distance is likely to be large or an optimization of the press-splitting conditions is needed, such press-splitting conditions may be changed. After the moving, the clamping device 3 clamps again the metal plate 1, or the metal rod 2, to secure by pinching. The preferred range of moving distance in the steps illustrated in FIGS. 1A and 1B is 0.01 to 10 mm at a time, more preferably 0.5 to 5 mm. The moving distance less than 0.01 mm is not preferable, because the splitting consumes longer time inviting significantly low work efficiency. The moving distance over 10 mm invites a problem not only such that deformation of the metallic workpiece becomes large but also such that the cutting edge of the punch will break or largely abrade. In the present invention, few problems like the one mentioned above will occur when the moving distance of the clamping device 3 is within the range of 0.5 to 5 mm.

In the step illustrated in FIG. 1D following the above, the press-splitting is performed applying the slitting punch 4 on the cleft of the split portion created in the step (B) stated above to split again. To advance the splitting further, the steps illustrated in FIGS. 1C and 1D are repeated until the length (or depth) reaches the specified extent. In the repetition of the steps illustrated in FIGS. 1C and 1D, the moving distance of the clamping device 3 may be a constant value, or instead, may be changed at each step. For example, to split highly accurately as designed, the moving distance of the clamping device 3 can be made, only at the last operation in the press-splitting, shorter than the one in the previous operation. Even in the case that the press-splitting conditions is required to be changed due to change in the split length, an automatic control is applicable to the move and pinch-clamp actions of the clamping device 3, the press-splitting conditions, or other working conditions using a control device such as a computer by grasping in advance the relationship between the split length and press-splitting conditions. This automatic control is applied to an end splitting method such that the splitting advances consecutively in one direction at a specified stroke, or to a progressive transfer end splitting method, wherein each of the steps in the press-splitting is separated and arrayed in a line so that a plurality of press-splitting steps will be performed progressively. In the present invention, the repetition of the press-splitting illustrated in FIGS. 1A to 1D may be applied not only to a method in which the repetition is performed consecutively with one unit of equipment or in one series of working processes, but also to a method in which the repetition is performed separately as an independent step. In such application, the automatic control method of the move of the clamping device 3 and the press-splitting conditions are still usable as a production control tool.

Second Embodiment

FIGS. 2A to 2D are an explanatory illustration of steps of the press-splitting in the second embodiment of the method for splitting the end part of a metal plate 1, or a metal rod 2, according to the present invention, wherein a slitting punch 4 is used while moving the metal plate 1, or the metal rod 2. In this embodiment, securing the metal plate 2, or the metal rod 2, by pinching with a clamping device 3 (FIG. 2A) and performing press-splitting applying the slitting punch 4 on the face of one end of the metal plate 1, or the metal rod 2 (FIG. 2B), are the same steps as those in the first embodiment illustrated in FIGS. 1A and 1B. The difference from the steps indicated in FIGS. 1A and 1B is that the metal plate 1, or the metal rod 2, is moved instead of moving the clamping device 3. The embodiment employs a step, in which the metal plate 1, or the metal rod 2, is secured again by pinching with the clamping device 3 after the metal plate 1, or the metal rod 2, is moved to the split-desired position (FIG. 2C). Then, similarly as in the step illustrated in FIG. 1D, the slitting punch 4 is applied on the cleft of the split portion to advance splitting by the press-splitting (FIG. 2D) and repeat the steps illustrated in FIGS. 2C and 2D in accordance with the split length.

In the step illustrated in FIG. 2C, the moving of the metal plate 1, or the metal rod 2, can be achieved by sliding a jig for example, which supports the metallic workpiece, by a split-desired distance. In that moving, the clamping device 3 for pinching is loosened slightly and then tightened to pinch again, after the metal plate 1, or the metal rod 2, was moved. Further, the slitting punch 4 should be retracted in advance so that the movement of the metal plate 1, or the metal rod 2, will not be impeded. This obstruction prevention may also be achieved by clearing the space between the clamped metal plate 1, or metal rod 2, and the slitting punch 4 in advance of the step illustrated in FIG. 2C, which permits the metal plate 1, or the metal rod 2, can move successively without obstruction. It should be noted that the steps illustrated in FIGS. 2A, 2B, and 2C are basically the same as the steps indicated in FIGS. 1A, 1B, and 1C, therefore, the end splitting is performed in a manner corresponding to the explanation of the first embodiment. In this embodiment, the distance of one movement of the metal plate 1, or the metal rod 2, is the same as the one specified in the first embodiment for the range of one move of the clamping device 3.

Third Embodiment

Figure 3A:
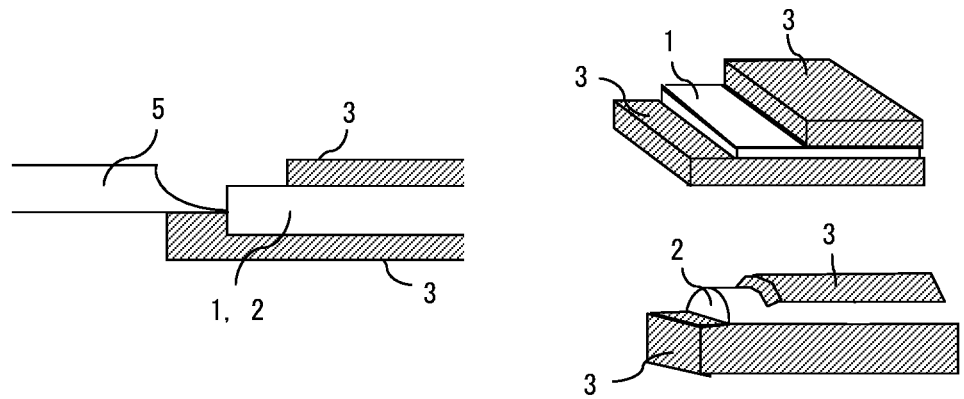
FIGS. 3A to 3D are an explanatory illustration of steps of the press-splitting in the third embodiment of the method for splitting the end part of a metal plate, or a metal rod, according to the present invention, wherein the cleaving punch is used while moving the clamping device.
Figure 3B:
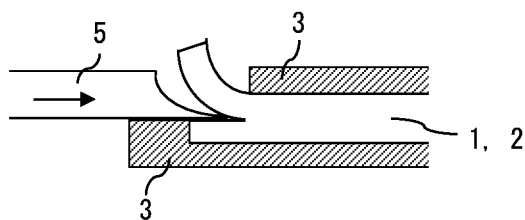
Figure 3C:
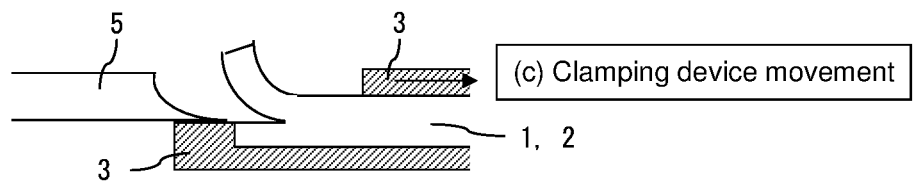
Figure 3D:
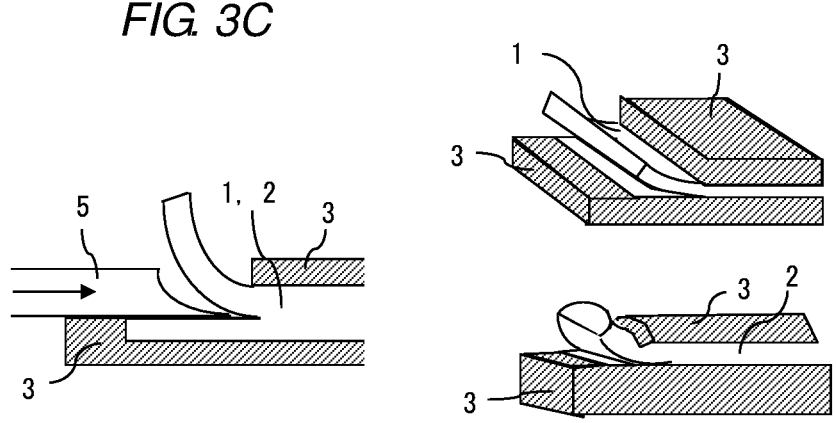

FIGS. 3A to 3D are an explanatory illustration of steps of the press-splitting in the third embodiment of the method for splitting the end part of a metal plate 1, or a metal rod 2, according to the present invention, wherein a cleaving punch 5 is used while moving a clamping device 3. As FIGS. 3A to 3D illustrate, the end splitting method in this embodiment comprises the steps of: securing the metal plate 1, or the metal rod 2, by pinching with the clamping device 3 (FIG. 3A); performing press-splitting, applying the cleaving punch 5 on the face of one end of the metal plate 1, or the metal rod 2, along one face of the clamping device 3 on one side (FIG. 3B); moving one side of the clamping device 3, which is disposed on the other side of the face on which the clamping device 3 stated above is arranged, to the split-desired position and securing again the metal plate 1, or the metal rod 2, by pinching with the clamping device 3 to secure (FIG. 3C); and applying the cleaving punch 5 on the cleft of the split portion to advance splitting by the press-splitting (FIG. 3D). The steps illustrated in FIGS. 3C and 3D are repeated until the split length (or depth) reaches the specified extent. Finally, the metal plate 1, or the metal rod 2, is formed into a shape having a split plane as illustrated in a perspective view FIG. 3D. After that, the end-split metal plate or metal rod undergoes press-forming, crimping, or press-squeezing to be formed into a metal part having a shape of, for example, Figure-T, Figure-L, or Figure-Y.

In the step illustrated in FIG. 3A, the metal plate 1 is secured by clamping device 3 with both sides pinched and the metal rod 2 is secured by securing device 3 with at least two opposite-facing portions on the periphery thereof pinched. Pinching at least two opposite-facing portions on the periphery of the metal rod 2 makes clamping the metal rod 2 tight. In addition, a clamping device that holds entire circumference of the metal rod 2 may be usable as a method for securing the metal rod 2. In the end splitting method using the cleaving punch 5 like this embodiment, placing the metal plate 1, or the metal rod 2, flat makes processing easy. Therefore, the clamping device that is arranged under the workpiece may have a flat bottom. Further in the present embodiment, fixing one side of the clamping device 3 (the clamping device that is arranged on the lower side in FIGS. 3A to 3D), the other side of the clamping device that is disposed on the other side of the face (the clamping device that is arranged on the upper side in FIGS. 3A to 3D) may be configured in a mobile style. Thereby, the moving of the clamping device 3 becomes easy and, further, the accuracy of positioning at the distal end of the split-desired portion on the metal plate 1, or the metal rod 2, is improved. Similarly, the clamping device 3 is moved in the step illustrated in FIG. 3C. In this moving, the moving distance can be the same as the one in the step illustrated in FIG. 3A or can be different one. For the same reason as stated in the first embodiment, the preferred range of the moving distance at a time is 0.01 to 10 mm, more preferably 0.5 to 5 mm.

In the step illustrated in FIG. 3B, the end splitting of the metal plate 1, or the metal rod 2, using the cleaving punch 5 is performed to the position almost the same as the position of one end of the pinching element of the clamping device 3 on one side that pinches the metal plate 1 or the metal rod 2. In FIG. 3B, in the portion pinched between the upper element of the clamping device 3 and the lower element of the clamping device 3, breakage or cleaving of the tissue of the metallic workpiece is suppressed due to compressive stress generated by the pinching force caused by both elements of the clamping device 3, which prevents occurrence of splitting during the press-splitting by the cleaving punch 5. On the other hand, the portion not pinched by the upper element of the clamping device 3 is splittable because the portion receives no clamping force. Therefore, adjusting the working position of the clamping device 3 can control freely the length of splitting. That "the position of one end of the clamping device that pinches the metal plate 1, or the metal rod 2, is almost the same as the position of the distal end of the split-desired portion" means, as is the same as in the first embodiment, a place where one end of the clamping device 3 sits is within the range of −3 mm to +1 mm, more preferably −1 mm to +0.5 mm, from the distal end of the split-desired portion. Further, the press-splitting conditions in this embodiment employ a similar range of the pressing load and the press-loading speed to those in the first embodiment. In the step illustrated in FIG. 3D, the press-splitting is performed with the cleaving punch 5 under the similar conditions. The conditions of the pressing load and the press-loading speed in the press-splitting with the cleaving punch 5 is not always necessary to be changed from the ones in the step illustrated in FIG. 3B because such conditions have an allowance to some extent. However, if a large change in the moving distance in the step illustrated in FIG. 3B from the initial length is intended or an optimization of the press-splitting conditions is needed, such press-splitting conditions may be changed.

The end splitting method illustrated in FIGS. 3A to 3D is able to position and secure the end-splitting portion of a metal plate, or a metal rod, easily with high-accuracy using the clamping device 3 arranged lower part; therefore, the splitting of the end part into a thin thickness becomes practicable. Further, not only a simple two-portion splitting but also a three or more multi-portion splitting is easily achieved by splitting one portion by one portion from the top toward bottom. Thus, the method has an advantage of being able to manufacture metal parts applicable to various use.

Fourth Embodiment

FIGS. 4A to 4D is an explanatory illustration of steps of the press-splitting in the fourth embodiment of the method for splitting the end part of a metal plate 1, or a metal rod 2, according to the present invention, wherein a cleaving punch 5 is used while moving the metal plate 1, or the metal rod 2. The end splitting method in this embodiment comprises the steps of: securing the metal plate 1, or the metal rod 2, by pinching with a clamping device 3 (FIG. 4A); and performing press-splitting, applying the cleaving punch 5 on the face of one end of the metal plate 1, or the metal rod 2, along the face of the clamping device 3 on one side (FIG. 4B), which are the same as the steps illustrated in FIGS. 3A and 3B. The difference from the steps illustrated in FIGS. 3A and 3B is that the metal plate 1, or the metal rod 2, is moved instead of moving the clamping device 3 on one side. This embodiment employs the step illustrated in FIG. 4C moving the metal plate 1, or the metal rod 2, together with one side of the clamping device 3 securing the bottom side of the metal plate 1, or the metal rod 2, to the split-desired position and then pinching again to secure the metal plate 1, or the metal rod 2, with the clamping device 3 securing the top side of the metal plate 1, or the metal rod 2. In the step illustrated in FIG. 4C, a method moving at first the clamping device 3 securing the bottom side to create a clearance at the top of the metal plate 1, or the metal rod 2, and then moving the metal plate 1, or the metal rod 2, may be employed. Following the above, the step illustrated in FIG. 4D performing the press-splitting by applying the cleaving punch 5 on the cleft in the split face to advance splitting is progressed similarly as illustrated in FIG. 3D. Then, repeat the steps illustrated in FIGS. 4C and 4D in accordance with the desired split length.

Figure 4A:
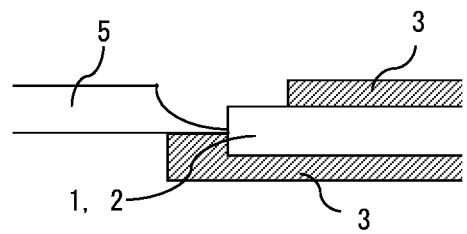
FIGS. 4A to 4D are an explanatory illustration of steps of the press-splitting in the fourth embodiment of the method for splitting the end part of a metal plate, or a metal rod, according to the present invention, wherein the cleaving punch is used while moving the metal plate, or the metal rod.
Figure 4B:
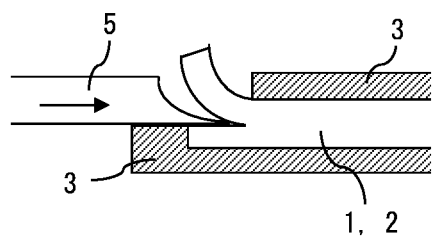
Figure 4C:
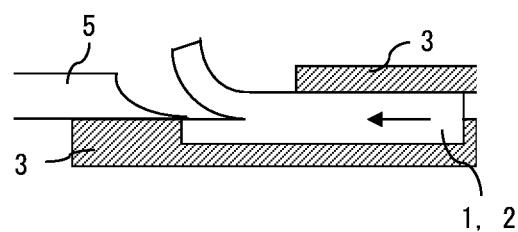
Figure 4D:
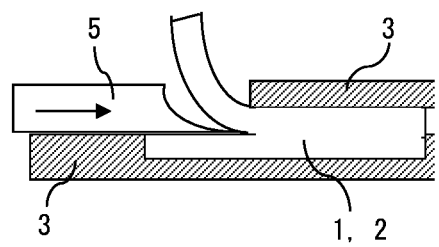

In the step illustrated in FIG. 4C, the moving of the metal plate 1, or the metal rod 2, can be achieved by sliding a jig for example, which supports the metallic workpiece, by a split-desired distance. In that moving, the clamping device 3 for pinching is loosened slightly and then tightened to pinch again, after the metal plate 1, or the metal rod 2, was moved. Further, the cleaving punch 5 should be retracted in advance so that the movement of the metal plate 1, or the metal rod 2, will not be impeded. This obstruction prevention may also be achieved by clearing the space between the clamped metal plate 1, or metal rod 2, and the slitting punch in advance of the step (c), which permits the metal plate 1, or the metal rod 2, can move successively without obstruction. It should be noted that the steps illustrated in FIGS. 4A, 4B and 4C are basically the same as the steps indicated in FIGS. 3A, 3B and 3C, therefore, the end splitting is performed in a manner corresponding to the explanation of the third embodiment. In this embodiment, the distance of one movement of the metal plate 1, or the metal rod 2, is the same as the one specified in the third embodiment for the range of one move of the clamping device.

Next, the following explains an end splitting method by the present invention with improved productivity in each of the first to fourth embodiments. The method employs a sequential operation of the press-splitting.

For steps illustrated in FIGS. 1 to 4, an operation that covers moving both of or one side of the clamping device 3 by a stroke corresponding to the specified split length in one direction and then performing the press-splitting on the end part of the metal plate 1, or the metal rod 2, is defined as one step. This end splitting method sequentially and automatically repeats that step to advance the end splitting until the splitting finally reaches the desired length (or depth). In this method, instead of moving the clamping device 3, moving continuously and automatically the metal plate 1, or the metal rod 2, which is a metallic workpiece, by a specified stroke may be employed to perform the steps (A) to (D) illustrated in FIGS. 1 to 4 sequentially in one direction. In this processing, the position of the slitting punch 4 or the cleaving punch 5 before starting the press-splitting is regulated by the a computer using a position sensor as specified. Likewise, both sides or one side of the clamping device 3 is also automatic-controlled to move to the specified position. Further, as explained previously, in the case that the press-splitting conditions is required to be changed due to change in the split length, an automatic control is applicable to the move and pinch-clamp actions of the clamping device 3, the press-splitting conditions, or other working conditions using a control device such as a computer by grasping in advance the relationship between the split length and press-splitting conditions.

Figure 5A:
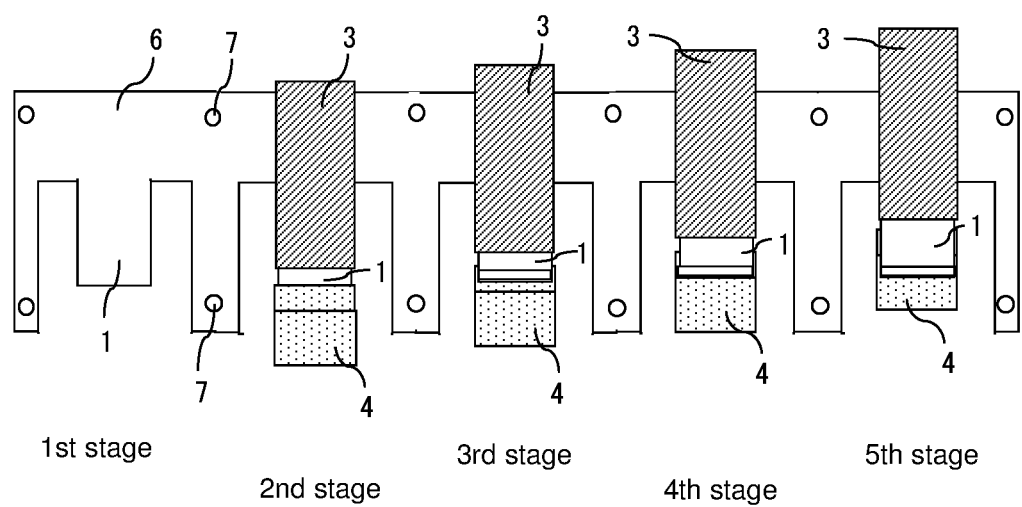
FIGS. 5A and 5B are an explanatory illustration of steps of the end splitting method according to the present invention, wherein the progressive transfer method is employed.
Figure 5B:
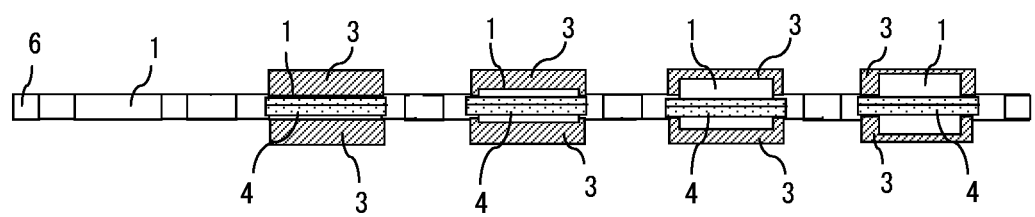

As another method for the end splitting by a sequential operation of the press-splitting, a progressive transfer line manufacturing configuration can be cited. The press-splitting steps illustrated in FIGS. 1 to 4 are separated into a single step of processing and arranged in an in-line configuration of a series-processing layout, in which plural steps in the press-splitting operation are performed progressively. The following explains the steps in the progressive transfer end splitting method referring to FIGS. 5A and 5B. The end splitting method illustrated in FIGS. 5A and 5B is an example, in which the end splitting is performed by the press-splitting using a slitting punch 4. In the steps of the method for splitting end part of a metal plate 1, FIG. 5A and FIG. 5B are a plan view and a side view respectively.

The progressive transfer end splitting method performs the splitting of the end part of a metal plate as illustrated in FIGS. 5A and 5B. In the method, a long metal material 6 having a specified thickness is fed intermittently. At the first stage of processing, a metal plate 1 is shaped into rectangular, then at the second stage, the metal plate 1 is pinched with a clamping device 3 and undergoes the first splitting of the end part in the press-splitting processes by the slitting punch 4. At the third and successive stages, the metal plate 1 experiences the move of the clamping device 3 and is again pinched with the clamping device 3 after its move to undergo the press-splitting by the slitting punch 4. Thus, the splitting of the end part of the metal plate progresses. For simplicity, FIGS. 5A and 5B illustrate only the steps down to the fifth stage. In the present invention however, the number of the processing stages after the third stage may be changed and the total number of the processing steps and the length of the long metal material 6 can be determined in accordance with the split length per one step and the last split length to complete the splitting processes. The length of the long metal material 6 changes depending not only on the number of the processing steps in the press-splitting but also on the shape of the metal plate 1, method of machining, shape of processing mold, or other factors. The long metal material 6 is cut into pieces for successive final processing or cut into pieces after the final processing.

In the intermittent feed of the long metal material 6 illustrated in FIGS. 5A and 5B, inserting a mold pin in a sprocket hole 7 makes the long metal material 6 to be placed in position and prevents the occurring of back-lash during press-splitting and processing. Further, the metal plate 1, after processed into a rectangular shape at the first stage illustrated in FIGS. 5A and 5B, may undergo bending at a right-angle at the second stage, and then, the first splitting of the end part at the third stage, and further then, may be advanced to the end splitting by the cleaving pinch 4 at the fourth or successive stages. In addition, the present invention can employ a simultaneous application of the same processing on the plural metal plates by feeding the long metal material 6 intermittently in a batch of two or more numbers of the metal plate 1, not an intermittent feeding in a one by one manner. Furthermore, the long metal material 6 may undergo the end splitting being fed in a lead frame feeding manner by dividing processing steps into a lead frame basis handling the long metal material 6 as one lead frame. The progressive transfer method illustrated in FIGS. 5A and 5B is a press-splitting with a slitting punch; the present invention can employ the same progressive transfer method in the case of press-splitting with a cleaving punch.

As stated above, by performing the press-splitting with a slitting punch or a cleaving punch consecutively in one direction or in a progressive transfer method at a specified stroke, an end splitting system that has an excellent productivity with lowered manufacturing cost can be established.

The end splitting method in the present invention may employ a means explained below to increase the processing speed and to form an even split face.

Figure 6A:
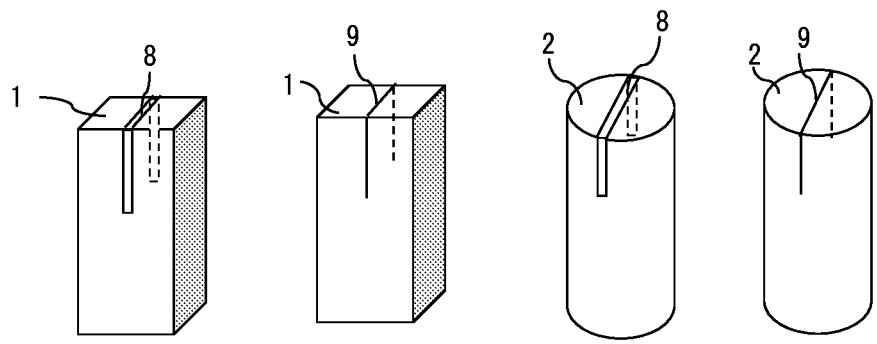
FIGS. 6A to 6C are an explanatory illustration of steps of the end splitting method according to the present invention, wherein a groove cut or a nick line is provided on the metal plate, or the metal rod, in advance.

As FIG. 6A illustrates, the means is such that a groove cut 8 or a nick line 9 is made in advance on at least one of places in the peripheral portion of the end part of the metal plate 1, or the metal rod 2, wherein the places are a place where the slitting punch or the cleaving punch is applied to and a place periphery of the metal plate 1, or the metal rod 2, that corresponds to the split-desired portion of the metal plate 1, or the metal rod 2. The groove cut 8 made in the end splitting method by the present invention is formed from the surface of the metal plate 1, or the metal rod 2, to a depth not deeper than the width of the metal plate 1 or not deeper than ⅕ of the diameter of the metal rod 2; that is, the groove cut 8 does not mean a cutting plane. The groove cut 8 or the nick line 9 can be made automatically in advance using a scriber, a cutter, a die, or other known tool. It is also possible to form a cut groove using a chemical. In this method, a mark-off line is scribed and a trace quantity of a chemical or the like is applied on the scribed line, then the chemical-applied portion of metal will be partly dissolved creating a cut groove.

Figure 6B:
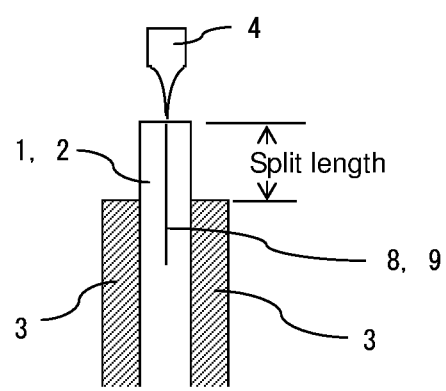
Figure 6C:
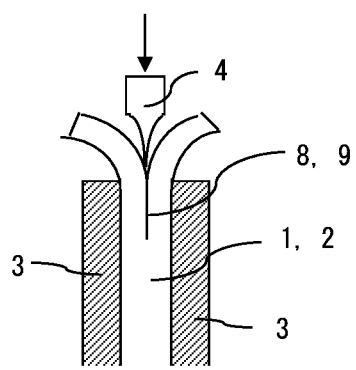

By making above-mentioned groove cut 8 or nick line 9 on the splitting position in the cross-section of the metal plate or the metal rod, applying the slitting punch 4 or the cleaving punch (not illustrated) on the splitting position becomes easy permitting a highly accurate end splitting with a simple manner. Further, forming the groove cut 8 or the nick line 9 on the periphery of the metal plate 1, or the metal rod 2, as illustrated in FIGS. 6B and 6C, makes the splitting by the press-splitting with the slitting punch develop along the groove cut 8 or the nick line 9 making the end splitting easy. In this case, the forming of the groove cut 8 or the nick line 9 to the distal end of the split-desired portion makes it possible to give a limitation of the split length (or depth) to a desired length in advance.

Fifth Embodiment

Figure 7A:
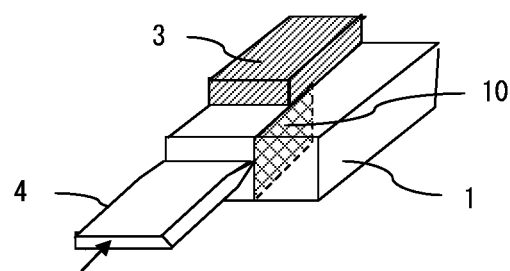
FIGS. 7A to 7D are an explanatory illustration of steps of the end part splitting in the fifth embodiment of the present invention, wherein the end splitting is performed with a cutting plane formed in the end part of the metal plate, or the metal rod, to create a boundary of splitting to split partially.
Figure 7B:
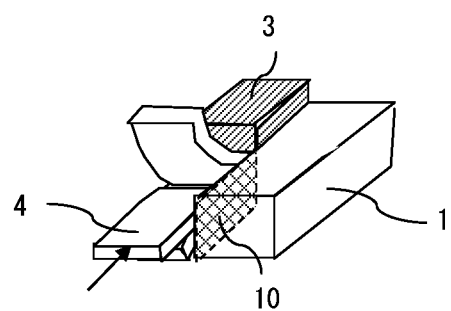

FIGS. 7A to 7D illustrate the steps in a method for splitting partially an end part of a metal plate 1, or a metal rod 2, by a press-splitting with a slitting punch 4. In this embodiment, to split partially the end part, a cutting plane is provided perpendicularly to the split face in the cross-section of a metal plate, or a metal rod. First, one cutting plane 10 is formed in the thickness direction of the metal plate 1. Then, the slitting punch 4 is applied on the partial-split-desired cross-section of the metal plate 1 on the boundary of the cutting plane 10 to perform the first processing in the press-splitting (FIG. 7A). At that time, two positions on the both sides of the split-desired portion of the metal plate 1 are pinched with a clamping device 3. Then, the press-splitting with the slitting punch 4 is progressed and finally either side of the metal plate 1 on the boundary of the cutting plane 10 is partially split (FIG. 7B).

Figure 7C:
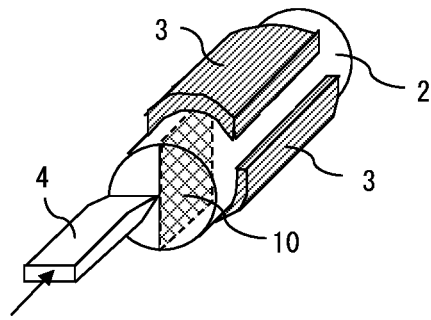
Figure 7D:
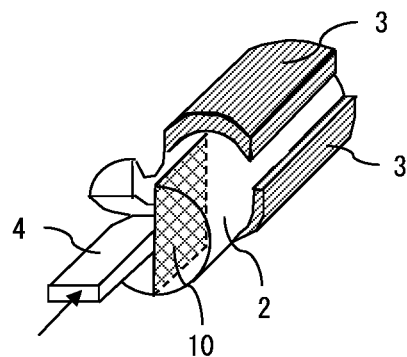

The partial splitting of the end part of the metal rod is performed in a basically same steps as in the metal plate. After forming one cutting plane 10 in the diameter-wise direction of the metal rod 2, the slitting punch 4 is applied on the partial-split-desired portion of the metal rod 2 on the boundary of the cutting plane 10 to perform the first processing in the press-splitting (FIG. 7C). At that time, two positions on the periphery of the partial-split-desired portion of the metal rod 2 are pinched with the clamping device 3. Then, the press-splitting with the slitting punch 4 is progressed and finally either side of the metal rod 2 on the boundary of the cutting plane 10 is partially split (FIG. 7D).

In this embodiment, the forming of the cutting plane 10 to the distal end of the partial-split-desired portion makes it possible in each case of a metal plate or a metal rod to give a limitation of the split length (or depth) to a desired length in advance. Instead of the slitting punch illustrated in FIGS. 7A to 7D, a cleaving punch may be used. In addition, in the case of the metal plate, when the cutting plane is formed to the middle of the thickness of the metal plate, for example to a distance of ½ of the thickness and to a length of ½ of the depth of the metal plate 1, the partial splitting can be performed in a tearing-off style only on a rectangular portion of the metal, one side of which is the cutting plane (the part that is the about-⅛-portion of the metal plate as illustrated in FIG. 7B). Likewise, in the case of the metal rod, when the cutting plane is formed to the middle in the diameter-wise of the metal rod, for example to a distance to the center of the metal rod 2 and to a length of ½ of the metal rod 2, the partial splitting can be performed in a tearing-off style only on a quadrant portion of the metal, one side of which is the cutting plane (the part that is the about-⅛-portion of the metal rod as illustrated in FIG. 7D).

The end splitting method of this embodiment illustrated in FIGS. 7A to 7D may, in the partial splitting of each end part after forming the cutting plane on the splitting boundary at the end part of the metal plate, or the metal rod, employ the sequential press-splitting operation as stated above. The sequential press-splitting can employ a method in which the metal plate, or the metal rod, is moved by a specified stroke or the progressive transfer method comprised of separate steps as illustrated in FIGS. 5A and 5B to progress the processing. In this, the cutting step for creating the split boundary on the end part of the metal plate, or the metal rod, may be combined with the press step in a series of steps. Thereby, the productivity improvement and the manufacturing cost lowering can be achieved.

Figure 8A:
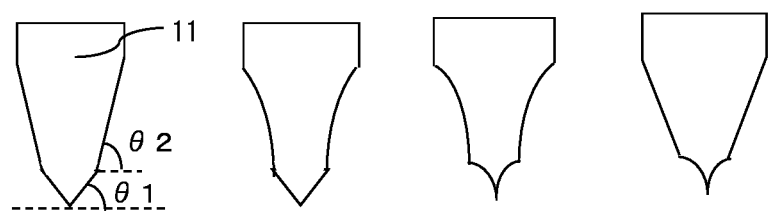
FIGS. 8A and 8B are sectional views that show an example of the shape of cutting edge of the slitting punch or the cleaving punch used in the end splitting method of the present invention.
Figure 8B:
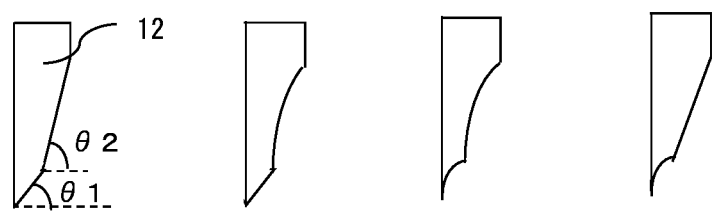

In the present invention, shaping the cutting edge of the slitting punch or the cleaving punch in a shape as illustrated in FIGS. 8A and 8B for example can be another method for not only to increase the speed of the press-splitting but also to form an even split face. FIGS. 8A and 8B illustrate cross-sections of a cutting edge 11 of the slitting punch and a cutting edge 12 of the cleaving punch.

The cutting edge illustrated in FIGS. 8A and 8B is given a tapering shape having at least two taper portions of different angles or curvatures, wherein the taper is provided on both sides in the case of the slitting punch and on one side in the case of the cleaving punch. Further, the taper portion of the side close to the tip end of the cutting edge is formed to have an angle or a curvature smaller than that of the taper on the side apart from the tip end of the cutting edge. Here, the angle of the cutting edge, as illustrated in FIGS. 8A and 8B, means the inclination angle ($\theta_2$ and $\theta_1$) of the cutting edge from the horizontal line based on the definition that the inclination of the horizontal line is zero-degree.

In the case of a cutting edge that has one tapered portion, there arise a problem such that the forming of a smooth and flat split face will be prevented, because the end part of metal separated into two may touch the side face of the cutting edge as the splitting progresses causing the split face roughening. Further, it may sometimes lower the work efficiency that the end part of metal separated by the splitting touches the cutting edge, because such touching prevents a smooth behavior of the separated end part of metal. This is a particularly serious problem in performing the press-splitting in a continuous manner. In addition, in the case where the tapered portion close to the cutting edge has a larger angle or a larger curvature compared to the tapered portion apart from the cutting edge, there arise also a problem such that the end part of metal separated into two touches the side face of the cutting edge, which is undesirable.

In the end splitting method by the present invention, a slitting punch or a cleaving punch, the cutting edge of each of which has one tapered portion, is usable. It is however preferable to use a punch having a cutting edge with the shape illustrated in FIGS. 8A and 8B to improve the work efficiency. Further, it is preferable to apply a super-hardening treatment to the cutting edge of the slitting punch or of the cleaving punch to be used in the present invention for increased strength or hardness. As the super-hardening treatment, the surface treatment by such as carburizing, nitriding, spraying, diamond-like carbon treating, and TiCN treating may be applicable.

Sixth Embodiment

The following describes a Figure-T shaped metal part as an example of metal parts made of a metal plate, or a metal rod, manufactured by the end splitting method of the present invention. FIGS. 9A to 9F are an explanatory illustration of the steps for manufacturing the Figure-T shaped metal part using the metal plate processed by the end splitting.

Figure 9A:
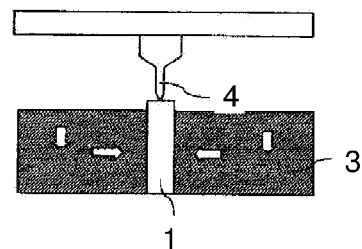
FIGS. 9A to 9F are an explanatory illustration of steps of manufacturing a metal part having Figure-T shape manufactured by the sixth embodiment of the present invention.
Figure 9B:
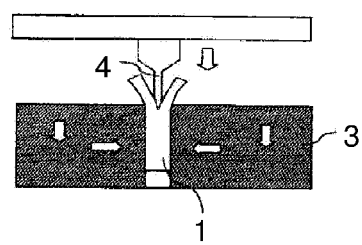
Figure 9C:
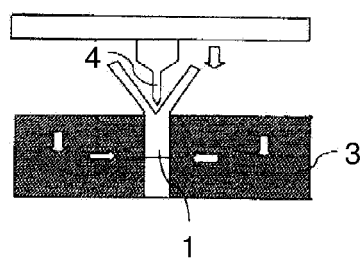
Figure 9D:
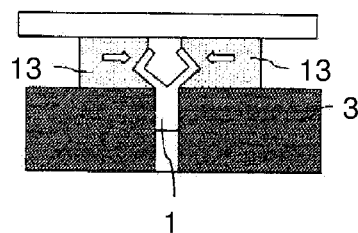
Figure 9E:
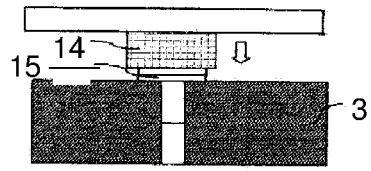

A metal plate 1 is pinched with a clamping device 3 (FIG. 9A), and then, likewise in the second embodiment, undergoes repeatedly the press-splitting with a slitting punch 4 (FIGS. 9B and 9C) in the longitudinal direction (in the vertical direction in FIGS. 9A to 9F) with respect to the metal plate 1 until the end of split portion reaches the specified length (or depth). Then, the half of the split metal end is folded toward the center from the periphery using a press die for bending 13 applying the die so that the split metal end separated into two will be surrounded (FIG. 9D). Further, a press die for appressing 14 is applied from above to make the surface of the metal plate 1 flat, which is crimped if necessary (FIG. 9E). Thus, the Figure-T shaped metal part 15 is manufactured (FIG. 9F).

Figure 9F:
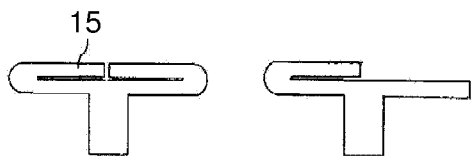

The split metal end of the Figure-T shaped metal part 15 is double-folded and formed flat; therefore every portion thereof has almost the same thickness (see illustration on the left side of FIG. 9F). In the conventional cutting method, it is impossible to make the thickness of the two-fold portion of the split metal end equal to the thickness of the metal plate before splitting due to thickness reduction in the cut portion. Application of the end splitting method of the present invention permits manufacturing a Figure-T shaped metal part having almost the same thickness at every portion thereof easily from the same metal plate as in the metal parts manufactured using bonding by welding, fusing, or gluing. Therefore, a cost-cut in manufacturing and reduction in use quantity of metallic material can be realized. Further, not having the bonded or glued portion, the Figure-T shaped metal part by the present invention has increased reliability and durability; therefore, the metal part can be used in high-value added parts such as mounts, footing bases, or connection pats having high thermal resistivity and excellent environment resistance.

FIGS. 9A to 9F illustrate such processing steps as folds both sides of the split metal end into two-fold. In the present invention, either of the sides of the split metal end may be folded into two-fold (see the illustration on the right side of FIG. 9F). In making two-fold, the folding lengths are not always necessary to be equal each other; the lengths can be changed according to the usage of metal parts. Folding style is not limited to two-fold; three or more folding is practicable. Further, the both sides of the split metal end can be split into different thicknesses.

FIGS. 9A to 9F illustrate an example of the manufacturing of Figure-T shaped parts using an end splitting method for a metal plate; however, using a metal rod, Figure-T shaped metal parts can be manufactured with the same processing steps. The fold-back portion of the split metal end can be one-bodied by such as welding, fusing, or gluing.

Seventh Embodiment

Figure 10A:
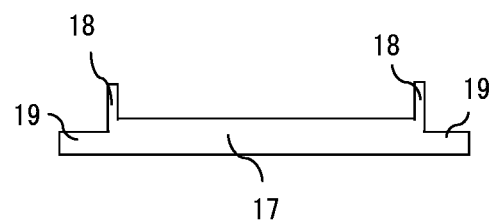
FIGS. 10A and 10B are an explanatory illustration of steps of manufacturing a metal part having Figure-L shape raised brim manufactured by the seventh embodiment of the present invention.
Figure 10B:
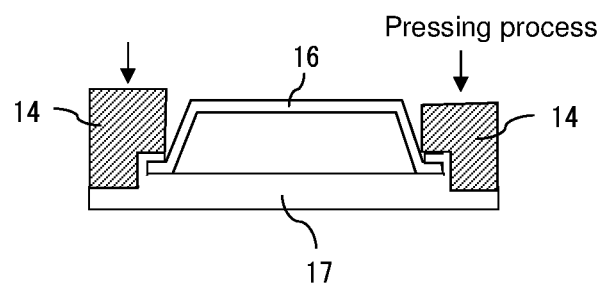

FIGS. 10A and 10B are an explanatory illustration of the steps for manufacturing a metal part 17 to be used as a metal base of an air-tight container, wherein the metal part 17 is manufactured by securing a cover 16 of metal or resin on the metal base using any one of methods: press-forming, welding, fusing, and gluing.

As in the third or fourth embodiment stated above, the workpiece is formed to have a raised brim by the press-splitting with a cleaving punch, and then the raised brim is pressed or drawn with a press die into a Figure-L shape (FIG. 10A). Then, the cover 16 of metal or resin is installed on the periphery of the metal part 17 having a Figure-L shaped raised brim 18, which is followed by a pressing process so that a hollow air-tight container will be manufactured (FIG. 10B). As a method for securing the cover 16 on the metal part 17, not only a press-forming but also bonding by welding or fusing, or gluing may be practicable. In this, electronic parts or mechanism elements are mounted in the center of the metal part 17 having the Figure-L shaped raised brim 18 in advance of installing the cover 16 of metal or resin. When needed, electrodes and electrode wiring that permit electrical connection with external terminals may be provided.

The metal parts of this embodiment can have an elongated split portion. Therefore, a wider space can be created in the flat portion formed by splitting into two (the part represented by numeral 19 in FIG. 10A). This means that a space for installing bolts or rivets can be assured in mounting the hollow air-tight container on the other base board or part. Further, operations such as press-forming, bonding by welding or fusing, or gluing that is performed when installing the cover 16 of metal or resin becomes easy, because the length of the Figure-L shaped raised brim 18 can be assured to some extent.

The metal part manufactured in the fifth and sixth embodiments stated above is usable after the post-processing applied to the split end part of metal with the face thereof as processed. If needed however, an anticorrosion covering layer may be formed at least on the split face by any method of metallic coating, organic coating, inorganic coating, or chemical conversion treatment. This anticorrosion covering may be formed not only for giving corrosion resistivity against rust but also for enhancing durability, thermal resistivity, or lubricity, or surface preparation. Further, such treatments is sometimes applied for the purpose of giving the metal plate, or the metal rod, a new function such as fingerprint resistivity, antibacterial, and washing-resistivity.

The metallic coating as above-stated anticorrosion covering is formed by, for example, hot dip plating using such as Zn, Al, Pb, Sn—Fe; or electroplating using such as Zn, Ni, Cr, Cu, Sn, Au; or electroless plating using such as Cu, Ni, Sn; or dry coating by physical or chemical deposition; flame spraying, etc. The inorganic coating includes such as ceramic coating, glassrizing, or enameling. The organic coating includes such as painting, laminating, or resinrizing. The chemical conversion treatment includes by such as phosphate treatment, chromate processing, oxidation, and anodic oxidation. In implementation of the present invention, it is preferable for maintaining a smooth and even split face to provide an anticorrosion covering layer of inorganic coating by electro-plating or electroless plating or to form the same by chemical conversion treatment by chromate processing.

Eighth Embodiment

Figure 11A:
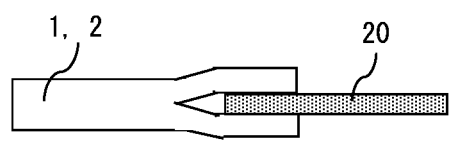
FIGS. 11A and 11B are illustrations that show a bonding method in the eighth embodiment of the present invention applied between the end-split metal plate, or metal rod, and the other metal plate.
Figure 11B:
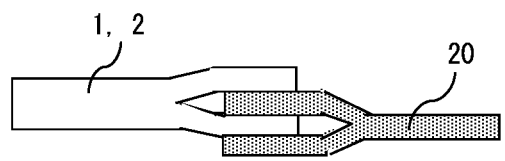

FIGS. 11A and 11B illustrate a method for bonding a metal plate 1, or a metal rod 2, which is split by the end split method of the present invention, to another metal plate 20. FIG. 11A illustrates a method for bonding that is performed with another metal plate 20 inserted between the split metal plate 1, or the split metal rod 2; FIG. 11B illustrates a method for bonding that is performed inserting split portion of metal plates so that they will interleave each other.

In this embodiment, the bonding of the metal plate 1, or the metal rod 2, which is split, to another metal plate 20 can be performed by any of pressing (including crimping), welding, fusing, bolting, riveting, and gluing. These methods may be used combining two or more method, for example, such as pressing and gluing, bolting and gluing, or riveting and gluing. Bonding by gluing is performed in a manner as follows: Glue is applied between the split metal plates, or the split metal rods, then the glued portions are pressed; in the being pressed state, the glued portions are heated to progress curing the glue. Or instead, the portions are heated to melt the glue and then cooled to form a uniform glue-applied layer, and then proceed to bonding process. The bonding may be also implemented in a manner such that another metal plate, the surface of which is applied with a glue, is inserted between the split metal plate, or the split metal rod, and then such portion is heated to become bonded.

Usually, it is hard to obtain a bonding with adequate quality in bonding between dissimilar metal plates. Even though adequate bonding quality be obtained initially, the stability thereof is not assured because such method creates very brittle intermetallic compounds at the bonding interface. In the case that the bonding between two dissimilar metal plates is made by gluing, a low bonding strength is unavoidable due to difference in linear expansion coefficient between the two; thus, ensuring reliable bonding has been a major issue. In contrast to this, the strength and reliability of bonding or joining will be largely improved when performed in a manner, as illustrated in FIG. 11A: splitting the end part of the metal plate 1, or the metal rod 2, sandwiching another metal plate 20 of dissimilar material between the end split portion of the metal plate 1, or the metal rod 2, to form a three-layer build-up, and then perform bonding or joining with a conventional method. Further, as FIG. 11B illustrates, a high strength of bonding or joining can also be obtained by a bonding method such that the end part of the metal plate 1, or the metal rod 2, made of two kinds of dissimilar metals is split and then such split ends are inserted so that they will interleave each other; this can improve the reliability of the bonding or joining strength.

As stated above, the present invention makes it practicable to split an end part of a metal plate having any of a rectangular, polygonal, or elliptical shape or an end part of a metal rod having a cross-section of any of a circular, elliptical, rectangular, or polygonal shape. In the multiple press-splitting, it becomes practicable to adjust the length (or depth) of the incision in the splitting freely within the desired range by adjusting the position of the clamping device for pinching a metal plate, or a metal rod, in each time of the press-splitting operation. Further, the end splitting method by present invention is capable of performing continuously the press-splitting with a slitting punch or a cleaving punch. This means that the invented method has an excellent productivity and at the same time offers lowered manufacturing cost. In addition to the above, the metal parts manufacture by the end splitting method of the present invention is compatible with not only changing freely the length of split portion but also adjustment of split thickness freely to a desired thickness. Thereby, it becomes possible to manufacture high-value added metal parts that were hard to manufacture by the conventional method. Moreover, the metal parts manufactured by the end splitting method of the present invention is feasible for employing a new bonding method that was unprecedented. Therefore, the applicability of the present invention to the fields that require more increased thermal resistivity and more enhanced environment resistance can significantly expand.

The end splitting method, metal parts manufactured by such end splitting method, and method for bonding such parts by the present invention is applicable to variety of applications such as automobiles, transportation equipment such as railway equipment such as rolling stocks, electronics devices, machine tools, heavy electrical machinery, nuclear-related equipment, and the leading-edge equipment in the field such as aviation or space technology. Therefore, the usefulness of the present invention is extremely high.

The invention claimed is:

1. A method for splitting an end part of a metal plate having any of a rectangular, polygonal, or elliptical shape, or an end part of metal rod having a cross-section of any of a circular, elliptical, rectangular, or polygonal shape, in a longitudinal direction with respect to the metal plate, or the metal rod, wherein the method comprises;

securing the metal plate by pinching both sides thereof with a clamping device, or securing the metal rod by pinching at least two opposite-facing portions on a periphery thereof with a clamping device; and advancing the splitting by pressing a slitting punch or a cleaving punch against a cleft of a split for repeatedly two or more times until a split length reaches a specified extent, wherein, in a process of splitting the metal plate, or the metal rod, longitudinally with respect to the metal plate, or the metal rod, by slitting or cleaving and in a process of advancing the splitting by the slitting or cleaving further, a press-splitting by the slitting punch or the cleaving punch is performed with a progressive transfer method comprised of separate processing stages, wherein, in advance of each time of each subsequent splitting operation of the two or more times, a position of at least one side of the clamping device that pinches both sides of a split-desired portion of the metal plate in securing or that pinches at least two opposite-facing portions on a periphery of a split-desired portion of the metal rod in securing, is moved along the metal plate or the metal rod in advance by a stroke corresponding to a distance from a position of the cleft of the split toward to a distal end of the split-desired portion, followed by securing of the metal plate by pinching both sides thereof with the clamping device, or by securing of the metal rod by pinching at least two opposite-facing portions on the periphery thereof with the clamping device, wherein, in each interval between splitting operations of the two or more times, pressing of the splitting punch or the cleaving punch is suspended and the splitting punch or the cleaving punch is moved back to a relatively opposite direction from a split-desired direction, wherein, on both sides in the case of the splitting punch or on one side in the case of the cleaving punch, a cutting edge is given a tapering shape having at least two taper portions of different angles or curvatures so that the taper portion of the side close to a tip end of the cutting edge has a smaller inclination angle from a horizontal line based on a definition that the inclination of the horizontal line is zero, or a smaller curvature than that of the taper on the side apart from the tip end of the cutting edge.

2. The method for splitting an end part of the metal plate, or a metal rod, according to claim 1, wherein a groove cut or a nick line is made in advance on at least one place in the peripheral portion of the end part of the metal plate, or the metal rod, wherein the at least one place indicates where the slitting punch or the cleaving punch is applied to and a place periphery of the metal plate that corresponds to the split-desired portion of the metal plate, or the metal rod.

3. A method for splitting a portion of end part of a metal plate having any of a rectangular, polygonal, or elliptical shape, or a portion of end part of metal rod having a cross-section of any of a circular, elliptical, rectangular, or polygonal shape, partially in a longitudinal direction with respect to the metal plate, or the metal rod, wherein the method comprises;

determining a desired length of a cutting plane in a thickness direction of the metal plate, or in a diameter direction of the metal rod;

applying a slitting punch or a cleaving punch on a split-desired end of the metal plate, or the metal rod, on a boundary created by the cutting plane;

securing the metal plate by pinching both sides of a split-desired portion thereof with a clamping device, or securing the metal rod by pinching at least two opposite-facing portions on a periphery of a split-desired portion thereof with a clamping device; and advancing the splitting by pressing the slitting punch or the cleaving punch against a cleft of a partial-split for repeatedly two or more times until a split length reaches a specified extent, wherein, in a process of splitting the metal plate, or the metal rod, longitudinally with respect to the metal plate, or the metal rod, by slitting or cleaving and in a process of advancing the splitting by the slitting or cleaving further, a press-splitting by the slitting punch or the cleaving punch is performed with a progressive transfer method comprised of separate processing stages, wherein, in advance of each time of each subsequent splitting operation of two or more times, a position of at least one side of the clamping device that pinches both sides of the split-desired portion of the metal plate in securing or that pinches at least two opposite-facing portions on the periphery of the split-desired portion of the metal rod in securing, is moved along the metal plate or the metal rod in advance by a stroke corresponding to a distance from a position of the cleft of a partial-split toward a distal end of the split-desired portion, followed by securing of the metal plate by pinching both sides thereof with the clamping device, or by securing of the metal rod by pinching at least two opposite-facing portions on the periphery thereof with the clamping device, thereby the metal plate, or the metal rod, is partially split in the longitudinal direction along the cutting plane, wherein, in each interval between splitting operations of the two or more times, pressing of the splitting punch or the cleaving punch is suspended and the splitting punch or the cleaving punch is moved back to a relatively opposite direction from a split-desired direction, wherein, on both sides in the case of the splitting punch or on one side in the case of the cleaving punch, a cutting edge is given a tapering shape having at least two taper portions of different angles or curvatures so that the taper portion of the side close to a tip end of the cutting edge has a smaller inclination angle from a horizontal line based on a definition that the inclination of the horizontal line is zero, or a smaller curvature than that of the taper on the side apart from the tip end of the cutting edge.

4. The method for splitting an end part of the metal plate, or a metal rod, according to claim 2, wherein a groove cut or a nick line is made in advance on at least one place in the peripheral portion of the end part of the metal plate, or the metal rod, wherein the at least one place indicates where the slitting punch or the cleaving punch is applied to and a place periphery of the metal plate that corresponds to the split-desired portion of the metal plate, or the metal rod.

* * * * *